(12) United States Patent
Demick

(10) Patent No.: US 7,377,563 B1
(45) Date of Patent: May 27, 2008

(54) DEPLOYABLE VEHICLE REAR ACCESS STEP APPARATUS AND METHOD

(75) Inventor: Robert L. Demick, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/758,045

(22) Filed: Jun. 5, 2007

(51) Int. Cl.
*B60R 19/48* (2006.01)

(52) U.S. Cl. ............... 293/116; 293/117; 280/164.1; 280/166

(58) Field of Classification Search ............ 296/62; 293/102, 106, 116, 117, 118; 280/163, 164.1, 280/166
See application file for complete search history.

(56) References Cited

U.S. PATENT DOCUMENTS

| 3,378,278 | A | * | 4/1968 | Letzel et al. ............. 280/163 |
| 3,580,613 | A | | 5/1971 | Northrup |
| 3,876,230 | A | * | 4/1975 | Phillips ................ 280/166 |
| 4,198,070 | A | * | 4/1980 | Weiler ................. 280/166 |
| 5,678,872 | A | | 10/1997 | Slater |
| 6,170,842 | B1 | | 1/2001 | Mueller |
| 2004/0100063 | A1 | * | 5/2004 | Henderson et al. ...... 280/166 |
| 2005/0110236 | A1 | * | 5/2005 | Stevenson ............. 280/163 |
| 2005/0258616 | A1 | * | 11/2005 | Scheuring et al. ....... 280/166 |
| 2006/0125204 | A1 | * | 6/2006 | Leitner et al. .......... 280/166 |

* cited by examiner

*Primary Examiner*—Jason S. Morrow

(57) ABSTRACT

A vehicle step includes an appearance surface; a pair of step surfaces; a lock for securing the step within a bumper; and a pivoting mechanism for rotating the step. The appearance face forms an external bumper surface when the step is stowed. The pivoting mechanism alternately deploys and stows the step manually or using a motor. A vehicle access method includes configuring a bumper with an affixable portion and connecting thereto a rotatable portion having an appearance surface and two step surfaces. The rotatable portion has a step surface formed on opposite surfaces of a first member, and an appearance surface formed on a surface of an intersecting second member. One step surface and the appearance surface are exposed when the rotatable portion rotates to one position, and the other step surface is exposed when the rotatable portion rotates to another position.

11 Claims, 4 Drawing Sheets

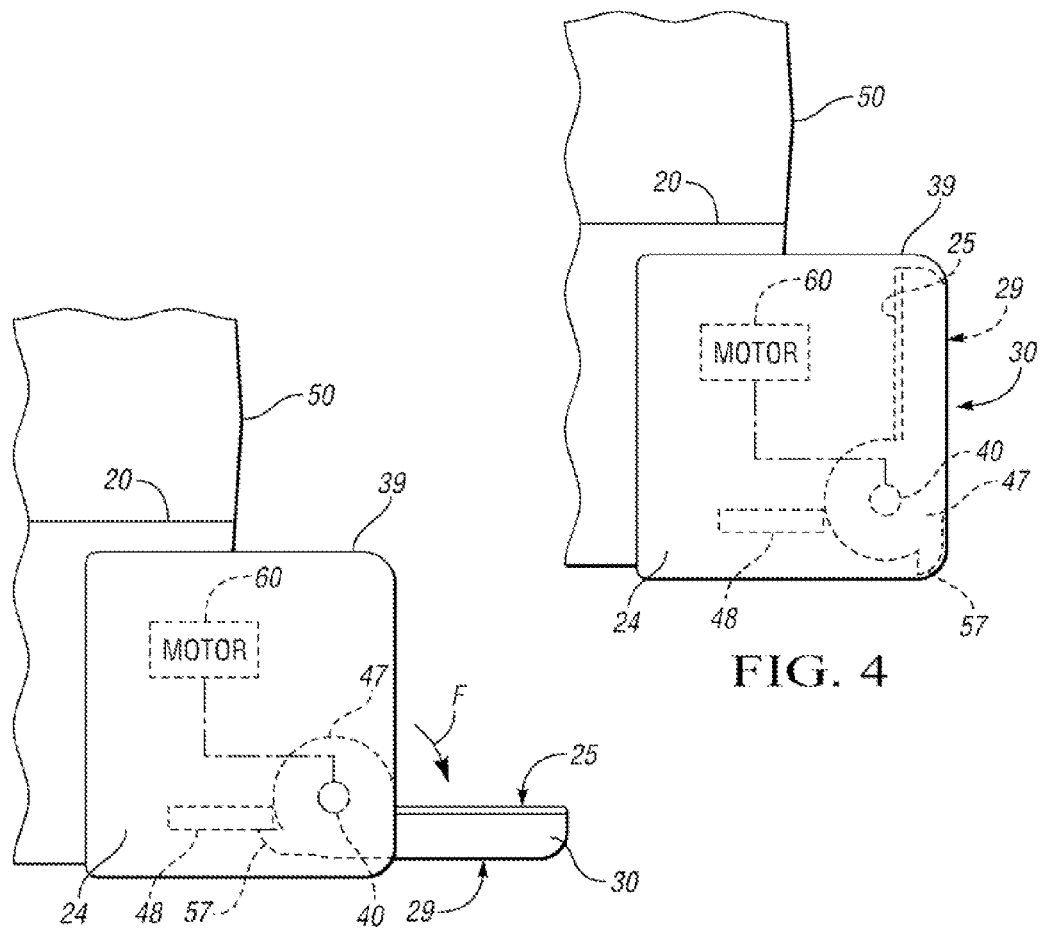
FIG. 4
FIG. 5
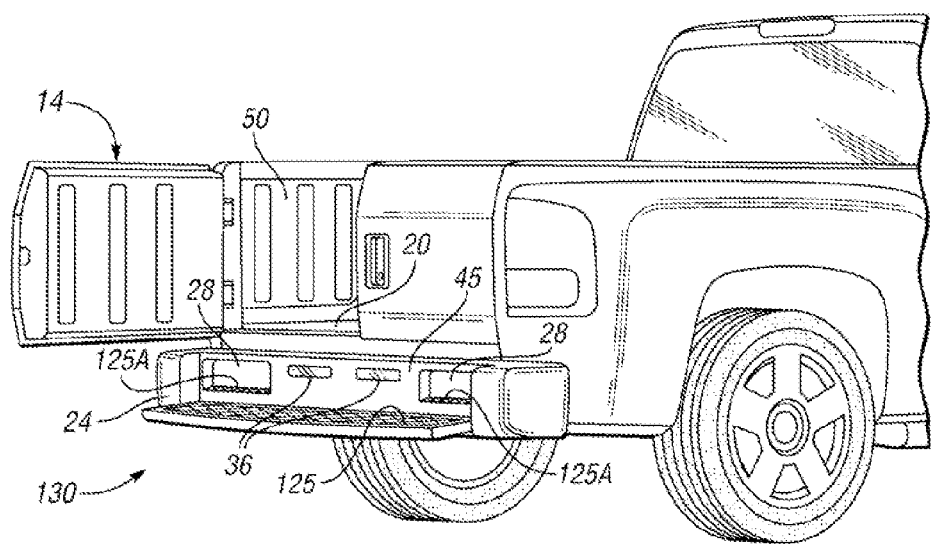
FIG. 6

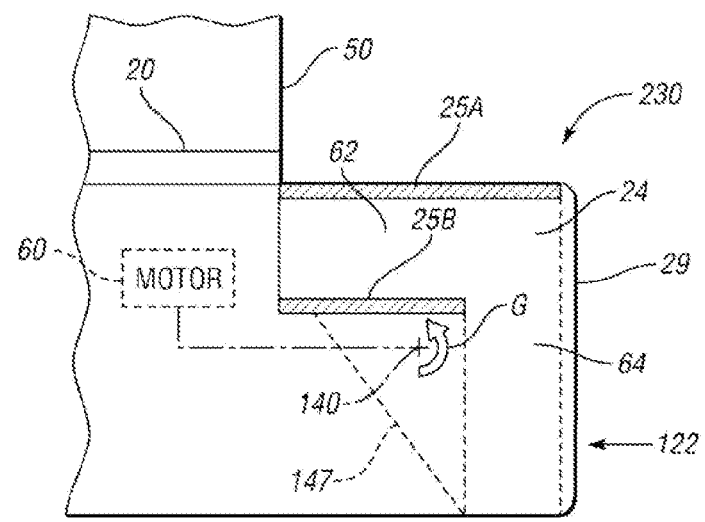
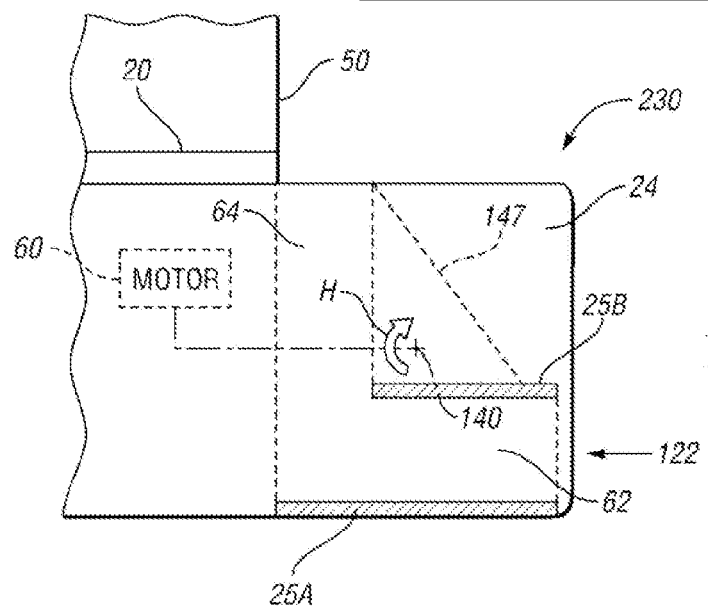
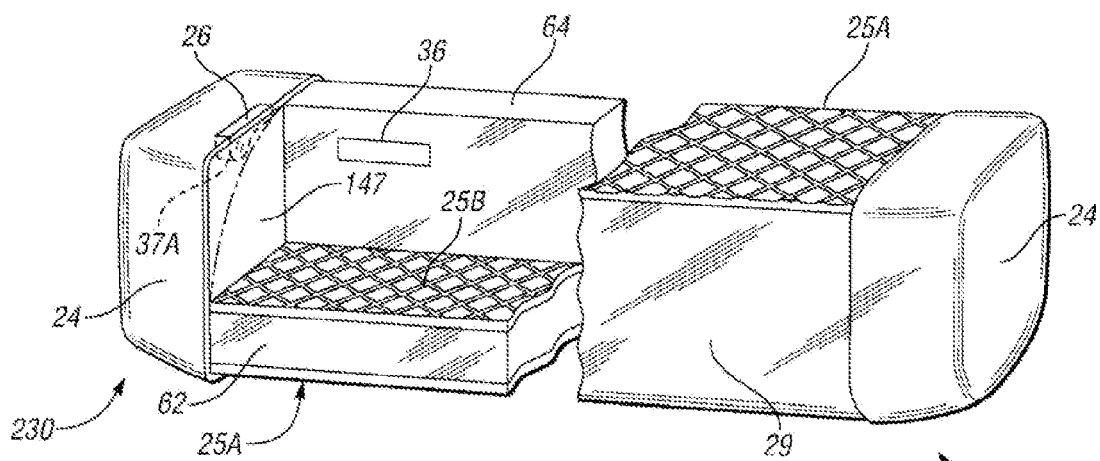

US 7,377,563 B1

DEPLOYABLE VEHICLE REAR ACCESS STEP APPARATUS AND METHOD

TECHNICAL FIELD

The present invention relates to a rear step for a vehicle, and in particular to an alternately deployable and stowable step apparatus for accessing a rear cargo area of a pickup truck or sport utility vehicle (SUV), and to a method for accessing the rear cargo area using the step apparatus of the invention.

BACKGROUND OF THE INVENTION

Modern vehicles such as pickup trucks and sport utility vehicles (SUVs) provide greater utility for some purposes in relation to smaller passenger cars, due in part to their substantially greater size and weight. This increases the amount, size, and weight of the various types of cargo that may be transported or towed by the vehicle. In particular, pickup trucks and SUVs may be better equipped to carry substantially larger and heavier loads such as machinery, equipment, construction materials, and recreational vehicles within a rear cargo area, or to transport groceries, occupants, and various personal effects within a separate passenger cabin, for example during family trips. Therefore, to accommodate the loading and unloading of such a variety of cargo, as well as to assist vehicle occupants in entering and exiting the elevated rear cargo area or truck bed, such vehicles often utilize one or more entry-assist mechanisms.

To facilitate access to the rear cargo area or bed, pickup trucks and SUVs may be equipped with drop-style tailgates that may be deployed as a platform, or with removable access ramps that connect to the bed to enable cargo and/or a recreational vehicle to roll up the ramp and into the rear cargo area. Alternately, and particularly for personal access to the rear cargo area, steps, door handles, and/or hand holds may be rigidly attached to the vehicle frame and/or molded into the vehicle body, and are usually trimmed or finished to add a desired look and aesthetic appeal. However, such exposed access devices may be less than optimal due to their relative weight and/or aerodynamic impact, or in the case of permanently mounted platforms, steps, or handles, their impact on the overall styling and aesthetic appeal of the vehicle. Therefore, certain hinged platforms are used to provide a convenient step for accessing a rear cargo area. However, such devices may be less than optimal for facilitating access to the rear cargo area from a variety of positions.

SUMMARY OF THE INVENTION

Accordingly, a vehicle is provided having a rear cargo area extending rearward from a passenger compartment. The vehicle includes a stationary bumper portion positioned adjacent to the rear cargo area and having an anterior wall and a pair of spaced end caps each containing a pivot mechanism, and further includes a rotatable step. The rotatable step has intersecting members, with one member having an upper and a lower step surface each formed on opposite sides of the member, and with the other member having a finished appearance surface formed on a major surface thereof.

In one aspect of the invention, the rotatable step is supported at either end by a different one of the spaced end caps, and rotates about the pivot mechanisms in one direction to present the lower step surface at a first height, and in another direction to present the upper step surface at a second height.

In another aspect of the invention, the rotatable step includes an electric motor configured to automatically actuate at least one of the pivot mechanisms to thereby rotate the rotatable step, alternately deploying and stowing the rotatable step with respect to the stationary bumper portion.

In another aspect of the invention, at least one partial step is formed in a recess in the anterior wall, and has a width of approximately ¼ to ⅓ the length of the upper or lower step surface.

In another aspect of the invention, at least one of the pair of spaced end caps includes a lateral surface having a recess therein forming a separate side step.

In another aspect of the invention, a bumper apparatus is provided for accessing a cargo bed of a vehicle, including a stationary bumper portion adapted for installation adjacent to the cargo bed and having an anterior wall and a pair of spaced end caps; a rotatable step spanning the distance between the spaced end caps; and a locking mechanism. The step has intersecting first and second members forming an L-shaped step configuration, with an upper step surface and a lower step surface formed on opposite sides of the first member, and an appearance surface formed on one axial surface of the second member. The locking mechanism is adapted to stow the lower step surface within the stationary bumper portion when the lower step surface is not deployed, and the appearance surface is a finished external surface of the bumper apparatus when the lower step is stowed within the stationary bumper.

In another aspect of the invention, a method of accessing a cargo area of a vehicle having a bumper is provided, including configuring the bumper with a stationary affixable portion adapted for installation on the vehicle, and with a separate rotatable portion having a first and second member arranged at approximately 90 degrees with respect to each other in an approximate L-shape. The method includes connecting the rotatable portion to the stationary affixable portion, and providing the first member with an upper and lower step surface on opposite sides, and providing the second member with an appearance surface on one side. The method further includes rotating the rotatable portion to one position to expose the upper step surface and appearance surface, and to another position to expose the lower step surface.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a cut away side view of the step of FIGS. 2 and 3 in a deployed position;

FIG. 5 is a cut away side view of the step of FIGS. 2, 3, and 4 in a stowed position;

FIG. 6 is a cut away perspective view of the vehicle of FIG. 1 having a second step embodiment in a deployed position;

FIG. 7A is a cut away side view of a third step embodiment in a stowed position;

FIG. 7B is a cut away side view of the step of FIG. 6A in a stowed position; and FIG. 8 is a fragmentary perspective view of the step of FIGS. 7A and 7B.

DESCRIPTION OF THE PREFERRED EMBODIMENTS

Figure 1:
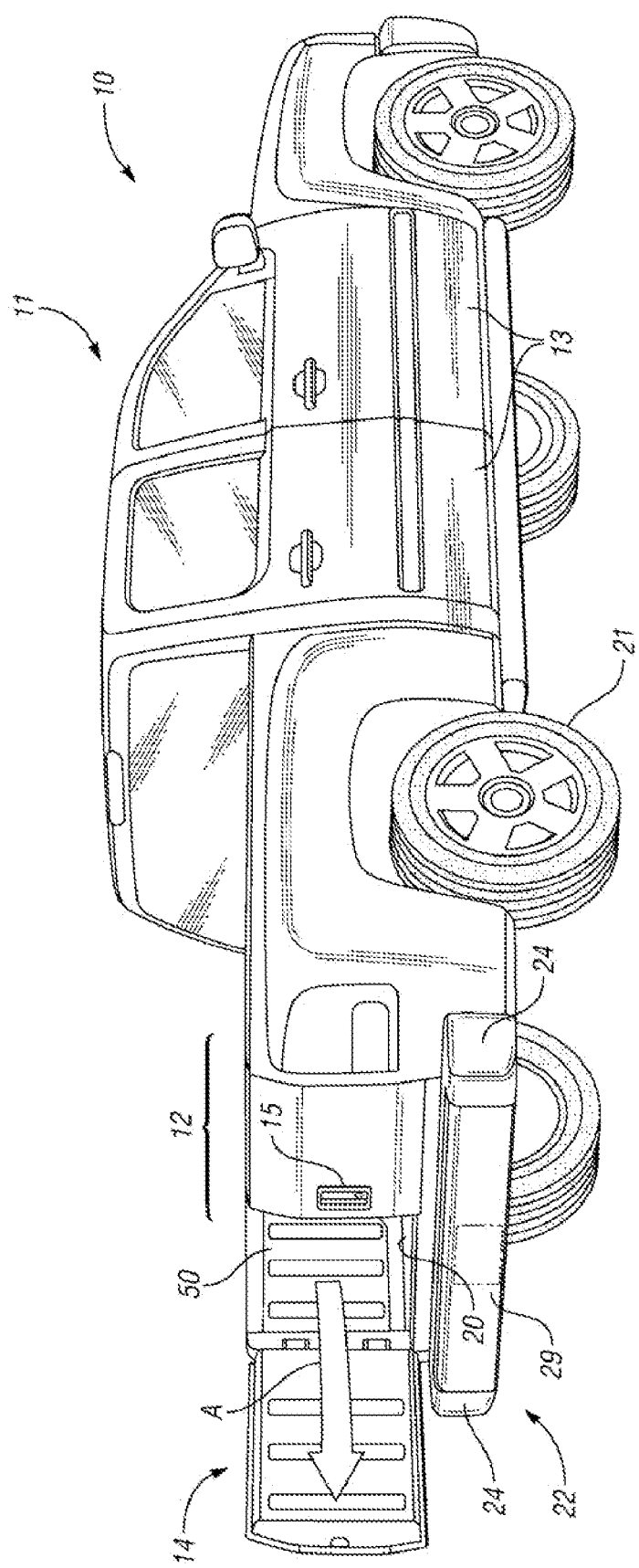
FIG. 1 is a schematic perspective view of a vehicle having a stowed, deployable vehicle access step according to the invention.

Referring to the drawings wherein like reference numbers correspond to like or similar components throughout the several figures, there is shown in FIG. 1 a vehicle 10, represented here as a pickup truck, but which may also take the form of a sport utility vehicle (SUV), crossover vehicle, or other similarly styled large vehicle having an elevated rear cargo area 12. Vehicle 10 has a plurality of passenger doors 13 positioned on either side of the vehicle 10 between a pair of wheels 21, with the doors 13 being suitably configured for access to a cabin or passenger compartment 11.

Rear cargo area 12 may be separate from passenger compartment 11 in the case of the pickup truck shown in FIG. 1, but alternately may be formed continuously with passenger compartment 11 such as in the case of an SUV or crossover vehicle, and extends rearward from passenger compartment 11 and terminates in a bumper apparatus or bumper 22. Rear cargo area 12 has a rugged floor or cargo bed 20 surrounded or bounded on two lateral sides by cargo bed walls 50, with cargo bed 20 being suitably configured and/or constructed to carry or transport a predetermined load in accordance with the particular design and intended purpose of vehicle 10.

Each of cargo bed walls 50 are operatively attached to one or more tailgate doors 14, which form the rear boundary walls of rear cargo area 12. Doors 14 are preferably arranged to form a 50/50-style split, i.e. with each of the doors 14 being substantially equal in size as shown in FIG. 1, and are each configured to pivot or swing outwardly in the direction of arrow A when unlocked and actuated by one or more door handles 15 to thereby allow access to cargo bed 20. However, within the scope of the invention the doors 14 may alternately include a single tailgate door, whether laterally or vertically hinged or pivotable, a 60/40-style split tailgate door, a cargo net, or a cargo gate, and/or any other closure device suitable for securing rear cargo area 12 as needed.

Bumper 22 is positioned or adapted for installation adjacent to the doors 14 of rear cargo area 12, and is preferably constructed so as to provide the desired level of low-speed collision protection consistent with bumpers of the type known in the art. For example, bumper 22 may be securely bolted, formed integrally with, or otherwise rigidly attached to an anterior body support structure or frame (not shown) of vehicle 10. Bumper 22 includes a deployable step 30 (see FIG. 2) having a finished, exposed appearance face or surface 29 on one side, and having on its opposite or backside a slip-resistant, deployable main step surface 25 (see FIG. 2) which may be stowed within bumper 22 to form the finished and/or contoured external appearance surface thereof according to the invention, and which will be described in more detail hereinbelow with reference to FIGS. 2 and 3.

Appearance surface 29 is preferably flanked by a pair of affixed, and therefore stationary, spaced end caps 24 which are molded, formed, and/or shaped to blend with appearance surface 29 in an aesthetically pleasing manner consistent with the overall cosmetic design of vehicle 10. For example, end caps 24 and appearance surface 29 may be formed from the same or complementary grades and/or compositions of molded plastic of a suitable color and/or surface texture, or from chrome or polished steel, and/or from composite materials to achieve the desired cosmetic design effect.

Figure 2:
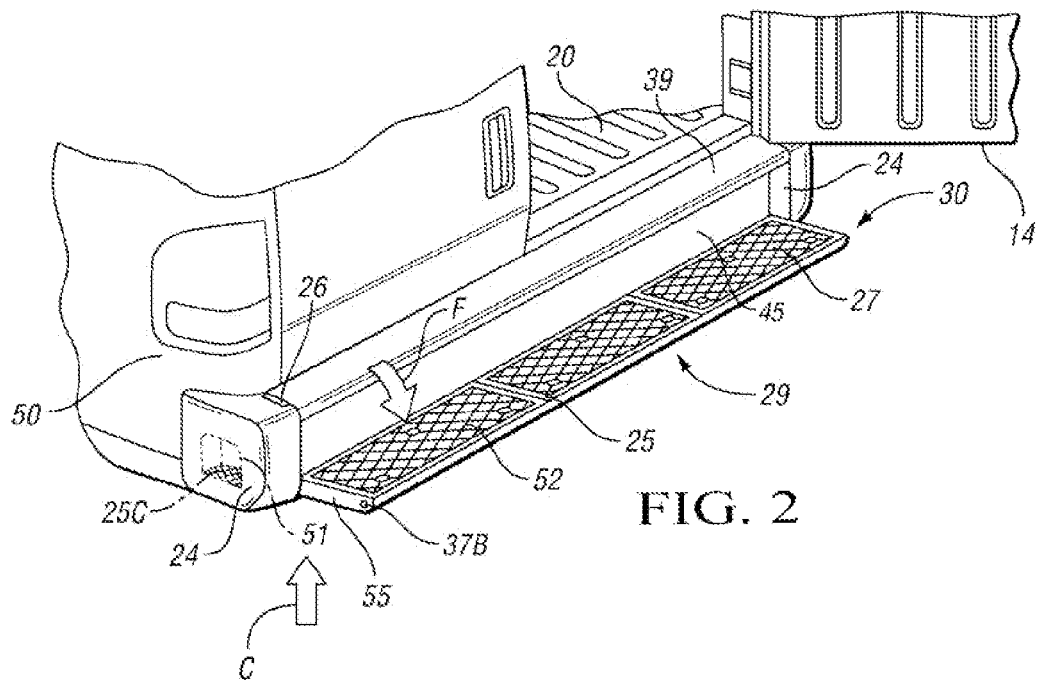
FIG. 2 is a schematic cut away perspective rear view of a full-width vehicle step of the invention in a fully deployed position.

Turning to FIG. 2, step 30 is shown in a fully deployed state, i.e. hinged, rotated, or articulated approximately 90 degrees toward the ground in the direction of arrow F, and securely locked or held at a position below the level of cargo bed 20 to provide a comfortable stepping distance for access to rear cargo area 12 (see FIG. 1). In such a position, an anterior wall 45 is exposed at a position adjacent to and beneath a lip 39, with step 30 preferably positioned perpendicularly to a stationary anterior wall 45. Lip 39 is a finished molding or trim piece attached to the vehicle 10 adjacent to cargo bed 20, and which may include a slip-resistant finish, such as a textured and/or rubberized external surface finish or layer 27, suitable for acting as an additional step surface when step 30 is stowed in bumper 22 (see FIG. 1).

Step 30 is a horizontal or substantially flat platform preferably constructed of a suitable grade and strength of material for supporting a predetermined load, as well as corrosion and wear resistance. Step 30 preferably extends the full or entire distance between the spaced end caps 24 to form a full-width step as shown. Step 30 includes the main step surface 25 suitable for facilitating access to cargo bed 20 and/or rear cargo area 12 (see FIG. 1), and that is preferably attached to, coated by, or formed integrally with a resilient, slip-resistant or otherwise textured surface 52, such as the non-slip waffle pattern shown in FIG. 2.

One or both of the spaced end caps 24 may include an optional cavity or step recess 51 having an end cap step surface 25C formed thereon or attached thereto. Step recess 51 is preferably open or unconcealed, with end cap step surface 25C being formed in a slip-resistant manner similar to that of main step surface 25. So positioned, end cap step surface 25C may facilitate quick access to a side portion of the roof of vehicle 10 (see FIG. 1), for example to tie or secure cargo to a roof rack, without requiring deployment of step 30.

Figure 3:
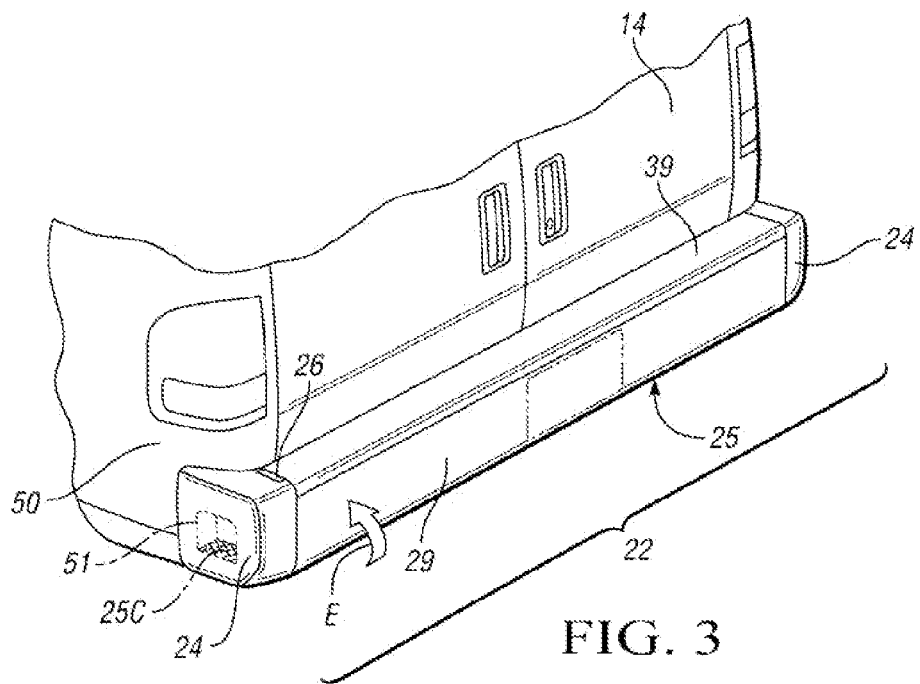
FIG. 3 is a cut away perspective rear view of the step of FIG. 2 in a stowed position.

The reverse procedure is followed in order to store or stow step 30 within or as part of bumper 22, i.e. between spaced end caps 24 when step 30 is rotated or articulated toward the cargo bed 20 in the direction of arrow E (see FIG. 3). Step 30 is then locked or secured adjacent to and below lip 39 via a locking mechanism 26, and substantially parallel to anterior wall 45. Locking mechanism 26 preferably has a first locking piece 37A (see FIG. 8) positioned within one or both spaced of the spaced end caps 24 and configured to engage a mating second locking piece 37B positioned within or along one and preferably both sides 55 of step 30. For example, mating first and second locking pieces 37A and 37B, respectively, may take the form of mating or complementary interlocking portions of a push-button latch or lock, a sliding latch, a rotary latch, or other suitable latching device or locking mechanism suitable for securing step 30. Main step surface 25 is shielded or protected from direct exposure to the elements by lip 39 when stowed against anterior wall 45 within bumper 22.

Turning to FIG. 3, as appearance surface 29 of bumper 22 rotates or articulates into full view in the direction of arrow E, and as step 30 (see FIG. 2) is locked or secured adjacent to and below molded lip 39 as described hereinabove, appearance surface 29 and end caps 24 together provide a finished, contoured appearance to bumper 22, with step 30 hidden behind appearance surface 29, and preferably undetectable to a casual observer.

Turning to FIG. 4, step 30 is shown from the perspective of the side of one of the spaced end caps 24, with step 30 fully stowed below lip 39 as described hereinabove. Main step surface 25 is therefore oriented inward toward anterior wall 45 and out of view, with appearance surface 29 facing outward to serve as a finished or molded appearance surface of bumper 22 and fully exposed to view. Step 30 has a pivot portion or pivot end 47 positioned within end cap 24, with pivot end 47 suitably configured to rotate or pivot around a pivot mechanism 40. A range limiting portion or range stop 57 is formed in or attached to pivot end 47 and extends a short distance therefrom to engage with a stationary beam or member 48 of the vehicle frame, or any sufficiently rigid portion of vehicle 10 (see FIG. 1), to thereby prevent rotation or articulation of step 30 beyond its intended range of motion.

Turning to FIG. 5, step 30 is shown in a fully deployed position, i.e. rotated or articulated in the direction of arrow F to the limit of its range of motion. Appearance surface 29 is rotated downward to face the ground, and main step surface 25 faces upward and exposed, ready to serve as a platform for facilitating access to cargo bed 20 within rear cargo area 12 (see FIG. 1). Range stop 57 is shown engaged with stationary member 48, thus limiting further rotation or articulation of step 30. Alternately, an electric motor 60 (also see FIG. 4) may be electrically connected to pivot end 47 at pivot mechanism 40, and configured to actuate step 30 in response to a signal from a conveniently positioned button or switch (not shown). For example, a switch (not shown) could be placed within a glove box within passenger compartment 11 (see FIG. 1), and/or positioned adjacent to a rear trailer hitch (not shown) within a protected enclosure.

Turning to FIG. 6, an alternate step 130 is shown in a fully deployed state. Step 130 operates as previously described hereinabove with respect to step 30, but in addition to the full-width main step surface 125, also includes a pair of partial or half steps 125A, with each half step 125A positioned adjacent to a different end cap 24 within a respective recess or cavity 28 formed in anterior wall 45 (also see FIG. 2). Each half step 125A is preferably approximately ¼ to ⅓ the width of main step surface 125. One or more lights, reflectors, and/or other illuminating devices 36 positioned on anterior wall 45 so as to emit or reflect sufficient light for marking the depth of main step surface 125 in low-light conditions. Configured in this manner, step 130 may facilitate access to cargo bed 20 by effectively shortening the riser height between main step surface 125, i.e. the full-width step, and cargo bed 20 by interposing half-steps 125A therebetween.

Turning to FIG. 7A, an alternate embodiment is shown as step 230 from the perspective of the side of one of the stationary end caps 24, i.e. the same perspective as FIGS. 4 and 5. Step 230 is a rotating step having a preferably rectangular step portion or member 62 and a preferably rectangular appearance portion or member 64, with step and appearance members 62 and 64 being respectively positioned, arranged, or aligned at approximately a 90 degree angle with respect to each other at their point of intersection to thereby form an approximate L-shaped configuration. Step member 62 has an outer or upper step surface 25A formed on or attached to a major surface or side, and an inner or lower step surface 25B formed or attached to its opposite major surface or side, with the term "major surface or side" referring to the surface or side of step member 62 having the greatest amount of surface area relative to the other surfaces or sides of step member 62.

Appearance member 64 likewise has appearance surface 29 formed on or attached to a major surface or side, with appearance surface 29 intersecting upper step surface 25A. Both appearance surface 29 and upper step surface 25A are therefore presented or exposed when lower step surface 25B is stowed, and are in turn both hidden from view when lower step surface 25A is deployed. Within each stationary end cap 24, a side wall or pivot end 147 is operatively connected to each of the step and appearance members 62 and 64, respectively, and includes a pivot mechanism 140 configured to pivot, articulate, and/or rotate step 230 as needed to thereby expose lower step surface 25B or upper step surface 25A as needed.

Turning to FIG. 7B, step 230 of FIG. 7A is shown with lower step surface 25B exposed in a deployed state, i.e. with step 230 having been rotated in the direction of arrow G (see FIG. 7A) and locked or held in place using locking mechanism 26 (see FIGS. 2, 3, and 8). In the deployed position, lower step surface 25B is exposed or presented and thus readily accessible at a second level or height that is lower than or below that of the first level or height of upper step surface 25A, thereby facilitating access to cargo bed 20 from a different and preferably more convenient level or height. To once again stow lower step surface 25B, locking mechanism 26 (see FIGS. 2, 3, and 8) is released and step 230 is rotated 180° to thereby return to the stowed position shown in FIG. 7A, with upper step surface 25A once again presented at the first level or height which is closer to the height or level of rear cargo area 12 (see FIG. 1) than is the second level or height of lower step surface 25B.

Turning to FIG. 8, a fragmentary perspective view of step 230 is shown with lower step surface 25B in the stowed and deployed positions described hereinabove with reference to FIGS. 7A and 7B, respectively. The right half of FIG. 8 shows lower step surface 25B in a stowed state (see FIG. 7A), with appearance surface 29 exposed as a finished or molded appearance face of bumper 122, and with upper step surface 25A exposed or presented as a stepping surface. The left half of FIG. 8 shows step 230 after having been rotated 180°, thereby exposing or presenting lower step surface 25B at a level, height, or elevation lower than that provided by upper step 25A in the stowed state, thereby facilitating access to rear cargo bed 20. One or more lights, reflectors, and/or other illuminating devices 36 is positioned on an exposed surface of appearance member 64 so as to emit or reflect sufficient light for marking the depth of lower step surface 25B in low-light conditions.

With reference now to FIGS. 7A, 7B, and 7C, this invention also includes a method of accessing the rear cargo area 12 (see FIG. 1) of a vehicle 10. The method includes configuring bumper 122 with an affixable stationary bumper portion, including stationary end caps 24, which are adapted for installation on vehicle 10, and with a rotatable portion including step 230. The rotatable portion, i.e. step 230, is configured with step member 62 and appearance member 64 arranged or oriented at an approximately 90 degree angle with respect to each other to form an L-shaped configuration. The method includes connecting the rotatable portion to the affixable portion, and forming or attaching an upper and lower step surface 25A and 25B, respectively, on opposite or reverse surfaces or sides of step member 62, and forming or attaching appearance surface 29 on a major surface or side of the appearance member.

The method includes rotating the step 230 in one direction to expose or present the lower step surface 25B, and rotating the step 230 in another direction to expose or present both the upper step surface 25A and appearance surface 29. The method may also include actuating an optional electric motor to alternately deploy and stow the lower step surface 25B with respect to the stationary end caps 24.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a passenger compartment;
a rear cargo area extending rearward from said passenger compartment;
a stationary bumper having a pair of spaced end caps, said stationary bumper being positioned adjacent to said rear cargo area, and a different one of said pair of spaced end caps being disposed at each distal end of said stationary bumper;
a pair of pivot mechanisms each positioned within a different one of said pair of spaced end caps;
a rotatable step having intersecting first and second members, said rotatable step having an appearance surface formed on a major surface of said first member and having different upper and lower step surfaces each formed on opposite major surfaces of said second member;
wherein said rotatable step is supported at either end by a different one of said pair of pivot mechanisms, and is rotatable about said pair of pivot mechanisms in one direction to present said lower step surface at a first height, and in another direction to present said upper step surface at a second height.

2. The vehicle of claim 1, including an electric motor configured to automatically actuate at least one of said pair of pivot mechanisms to rotate said rotatable step to alternately deploy and stow said lower step surface with respect to said stationary bumper.

3. The vehicle of claim 1, wherein said stationary bumper has an anterior wall, further comprising at least one partial step surface formed in a recess in said anterior wall, said at least one partial step surface having a width of approximately ¼ to ⅓ the width of at least one of said upper step surface and said lower step surface.

4. The vehicle of claim 1, wherein at least one of said pair of spaced end caps includes a lateral surface having a recess therein, said recess forming a separate side step.

5. A bumper apparatus for accessing a cargo bed of a vehicle, the bumper apparatus comprising:
a stationary bumper portion adapted for installation adjacent to the cargo bed, said stationary bumper portion having an anterior wall and a pair of spaced end caps;
a rotatable step apparatus extending laterally to span the distance between said pair of spaced end caps and having intersecting first and second members forming an L-shaped step configuration, said rotatable step apparatus having an upper step surface and a different lower step surface formed on opposite major surfaces of said first member, and an appearance surface formed on a major surface of said second member; and
at least one locking mechanism adapted for stowing said lower step surface within said stationary bumper portion when said lower step surface is not deployed;
wherein said appearance surface forms a finished external surface of said bumper apparatus when said lower step surface is stowed within said stationary bumper portion.

6. The bumper apparatus of claim 5, wherein said stationary bumper portion includes an anterior wall with at least one recess therein, said at least one recess having a partial step surface having a length of approximately ¼ to ⅓ the width of at least one of said upper and said lower step surfaces.

7. The bumper apparatus of claim 5, wherein each of said spaced end caps include a pivot mechanism configured to alternately deploy and stow said lower step surface with respect to said stationary bumper portion.

8. The bumper apparatus of claim 5, including an electric motor configured to automatically actuate at least one of said pair of pivot mechanisms to thereby alternately deploy and stow said lower step surface with respect to said stationary bumper portion.

9. A method of accessing a cargo area of a vehicle having a bumper, the method comprising:
configuring the bumper with a stationary affixable portion adapted for installation on the vehicle;
configuring the bumper with a separate rotatable portion having a first and a second member arranged at an approximately 90 degree angle with respect to each other to form an approximate L-shape configuration;
connecting said separate rotatable portion to said affixable portion;
forming an upper and a lower step surface on opposing or reverse major surfaces of said first member;
forming an appearance surface on a major surface of said second member;
rotating said rotatable portion to one position to thereby expose said upper step surface and said appearance surface; and
rotating said rotatable portion to another position to thereby expose said lower step surface.

10. The method of claim 9, further comprising automatically actuating said rotatable portion using an electric motor to thereby alternately deploy and stow said lower step surface.

11. The method of claim 9, further comprising configuring at least one of said pair of spaced end caps with a locking mechanism having a first portion positioned in at least one of said spaced end caps, and a mating second portion positioned in a lateral surface of said rotatable portion.

* * * * *